US009594652B1

(12) United States Patent
Sathiamoorthy et al.

(10) Patent No.: US 9,594,652 B1
(45) Date of Patent: Mar. 14, 2017

(54) SYSTEMS AND METHODS FOR DECREASING RAID REBUILDING TIME

(71) Applicant: Symantec Corporation, Mountain View, CA (US)

(72) Inventors: Maheswaran Sathiamoorthy, Mountain View, CA (US); Fanglu Guo, Los Angeles, CA (US); Alexandros G. Dimakis, Austin, TX (US)

(73) Assignee: Veritas Technologies, Mountain View, CA (US)

( * ) Notice: Subject to any disclaimer, the term of this patent is extended or adjusted under 35 U.S.C. 154(b) by 330 days.

(21) Appl. No.: 14/134,334

(22) Filed: Dec. 19, 2013

(51) Int. Cl.
G06F 11/00 (2006.01)
G06F 11/20 (2006.01)

(52) U.S. Cl.
CPC ................ *G06F 11/2053* (2013.01)

(58) Field of Classification Search
CPC .................................... G06F 11/1076
USPC ........................................ 714/6.24
See application file for complete search history.

(56) References Cited

U.S. PATENT DOCUMENTS

| 5,390,327 | A  | * | 2/1995  | Lubbers    | G06F 11/1084 714/6.32 |
| 6,971,042 | B2 | * | 11/2005 | Anderson   | G06F 11/1076 714/6.31 |
| 7,409,499 | B1 | * | 8/2008  | Kiselev    | G06F 11/1076 711/114  |
| 7,669,107 | B2 | * | 2/2010  | Forhan     | G06F 11/1092 714/763  |
| 8,239,621 | B2 | * | 8/2012  | Yamato     | G06F 17/30067 711/114 |
| 2005/0204108 | A1 | * | 9/2005 | Ofek       | G06F 11/1458 711/162  |
| 2008/0028274 | A1 | * | 1/2008 | Lin        | H03M 13/1108 714/752  |
| 2010/0023838 | A1 | * | 1/2010 | Shen       | H03M 13/1105 714/758  |
| 2011/0010434 | A1 | * | 1/2011 | Eleftheriou | H04L 61/1582 709/219  |

(Continued)

OTHER PUBLICATIONS

Sathiamoorthy, Maheswaran et al., "XORing Elephants: Novel Erasure Codes for Big Data", http://anrg.usc.edu/~maheswaran/Xorbas.pdf, as accessed Oct. 18, 2013, The 39th International Conference on Very Large Data Bases, Proceedings of the VLDB Endowment, vol. 6, No. 5, Riva del Garda, Trento, Italy, (Aug. 26-30, 2013).

*Primary Examiner* — Elmira Mehrmanesh
(74) *Attorney, Agent, or Firm* — Fisherbroyles LLP

(57) ABSTRACT

A computer-implemented method for decreasing RAID rebuilding time may include (1) identifying data for which there is a need for physical integrity and high availability, (2) segmenting the data sequentially into a plurality of groups of chunks, with each group of chunks including redundant data sufficient to rebuild a lost chunk within the group of chunks, (3) storing the groups of chunks on a storage array according to a four-cycle-free bipartite storage map that, for each group of chunks, stores each chunk on a different device set within the storage array and, when a chunk within a group of chunks is lost, enables all other chunks within the group to be read in parallel from different devices within the storage array. Various other methods, systems, and computer-readable media are also disclosed.

20 Claims, 11 Drawing Sheets

(56) References Cited

U.S. PATENT DOCUMENTS

2012/0131025 A1* 5/2012 Cheung ............ G06F 17/30159
　　　　　　　　　　　　　　　　　　　　　707/755
2013/0054913 A1* 2/2013 Maeda ...................... G06F 9/50
　　　　　　　　　　　　　　　　　　　　　711/162

* cited by examiner

SYSTEMS AND METHODS FOR DECREASING RAID REBUILDING TIME

BACKGROUND

A well-known observation in the computing industry called Moore's Law states that the number of transistors on integrated circuits doubles approximately every two years, with a corresponding increase in processing speed. Lesser-known is Kryder's Law, first popularized by Mark Kryder, former chief technology officer for SEAGATE, which says that magnetic disk storage capacity increases at a faster rate than processor speed.

While disk storage capacity has been increasing at an exponential rate, disk throughput speed has increased only linearly. One approach to dealing with this disparity is the use of redundant arrays of inexpensive disks (RAID). In some RAID configurations, a file may be broken into chunks and stored across several devices in the storage array. Since the chunks that include the file can be written and subsequently read again in parallel, the RAID array provides the performance of a single, large-capacity, faster device.

Another factor that has not kept pace with the rate of increase in disk capacity is the mean time between failure (MTBF) for disk drives. Various RAID configurations address the potential for data loss due to disk failure by mirroring, data parity schemes, or both. Data on a failed disk in a RAID array can be rebuilt, sometimes even without shutting off the storage array when replacing the failed disk drive. But because disk capacity has grown so large, the process of rebuilding data on a failed disk can take hours, or even days. During the rebuilding process, performance and capacity of the storage array may be reduced.

In view of the above, the instant disclosure identifies a need for systems and methods for decreasing RAID rebuilding time.

SUMMARY

As will be described in greater detail below, the instant disclosure generally relates to systems and methods for decreasing RAID rebuilding time by (1) taking advantage of the capability of a storage array to read and write chunks of data to different devices in parallel, and (2) increasing the amount of data that can be recovered after a parallel read. In one example, a computer-implemented method for accomplishing such a task may include (1) identifying data for which there is a need for physical integrity and high availability, (2) segmenting the data sequentially into a plurality of groups of chunks, with each group of chunks including redundant data sufficient to rebuild a lost chunk within the group of chunks, (3) storing the groups of chunks on a storage array according to a four-cycle-free bipartite storage map that, for each group of chunks, stores each chunk on a different device set within the storage array and, when a chunk within a group of chunks is lost, enables all other chunks within the group to be read in parallel from different devices within the storage array.

In some examples, the computer-implemented method may further include storing at least two chunks in sequence on a device within the storage array to enable the chunks to be read in sequence using a single seek. In one embodiment, the redundant data may include calculated parity data for the group of chunks. In another embodiment, a plurality of groups of chunks further may include additional redundant data sufficient to rebuild two lost chunks within the group of chunks. In another embodiment, the additional redundant data may include calculated parity data for a plurality of groups of chunks.

In some examples, the computer-implemented method may further include rebuilding chunks lost due to failure of a single device within the storage array by (1) reading, in parallel from a plurality of devices within the storage array, chunks from groups of chunks that include the lost chunks, (2) rebuilding the lost chunks by reversing parity calculations, and (3) writing, in parallel to a plurality of devices within the storage array, the rebuilt chunks to different devices within the storage array.

In some examples, reading chunks from the groups of chunks that include the lost chunks may include reading a plurality of chunks in sequence from a device within the storage array after a single seek. In some examples, the computer-implemented method may further include overwriting redundant data within the storage array with the rebuilt chunks. In some examples, the computer-implemented method may further include copying the rebuilt chunks to locations specified by the storage map.

In some examples, the computer-implemented method may further include rebuilding chunks lost due to failure of a plurality of devices within the storage array by: (1) reading, in parallel from a plurality of devices within the storage array, chunks from groups of chunks that include the lost chunks, (2) rebuilding single lost chunks from the groups of chunks that include the lost chunks by reversing parity calculations, (3) rebuilding lost chunks from groups of chunks that lost a plurality of chunks by reversing parity calculations using calculated parity data for a plurality of groups of chunks, and (4) writing, in parallel to a plurality of devices within the storage array, the rebuilt chunks to different devices within the storage array.

In one embodiment, a system for implementing the above-described method may include (1) a segmentation module that segments the data sequentially into a plurality of groups of chunks, with each group of chunks including redundant data sufficient to rebuild a lost chunk within the group of chunks, (2) a storing module that stores the groups of chunks on a storage array according to a four-cycle-free bipartite storage map that, for each group of chunks, stores each chunk on a different device set within the storage array and, when a chunk within a group of chunks is lost, enables all other chunks within the group to be read in parallel from different devices within the storage array, and (5) at least one processor configured to execute the identification module, the segmentation module, and the storing module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) identify data for which there is a need for physical integrity and high availability, (2) segment the data sequentially into a plurality of groups of chunks, with each group of chunks including redundant data sufficient to rebuild a lost chunk within the group of chunks, and (3) store the groups of chunks on a storage array according to a four-cycle-free bipartite storage map that, for each group of chunks, stores each chunk on a different device set within the storage array and, when a chunk within a group of chunks is lost, enables all other chunks within the group to be read in parallel from different devices within the storage array.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
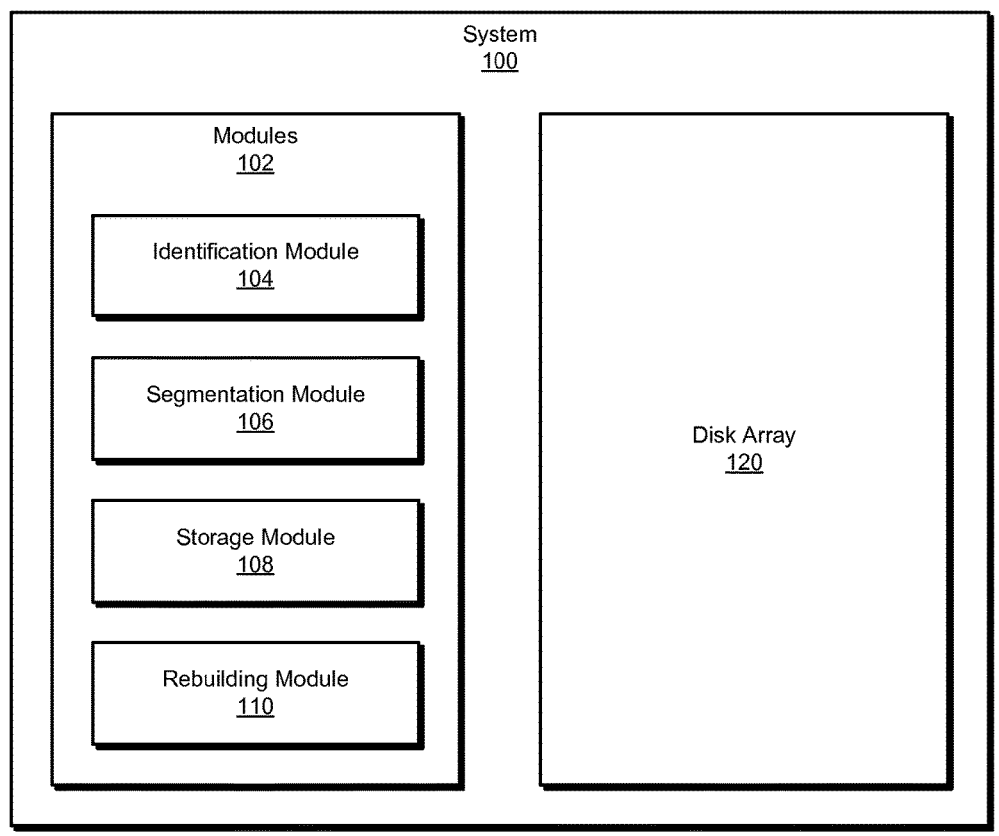
FIG. 1 is a block diagram of an exemplary system for decreasing RAID rebuilding time.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for decreasing RAID rebuilding time. As will be explained in greater detail below, the systems and methods described herein may take advantage of the capability of a storage array to read from and write to different devices in parallel to decrease RAID rebuilding time. The amount of data read after a single seek may also be increased by placing consecutive data chunks sequentially on a single device. The systems and methods described herein may also provide various other features and advantages.

Figure 2:
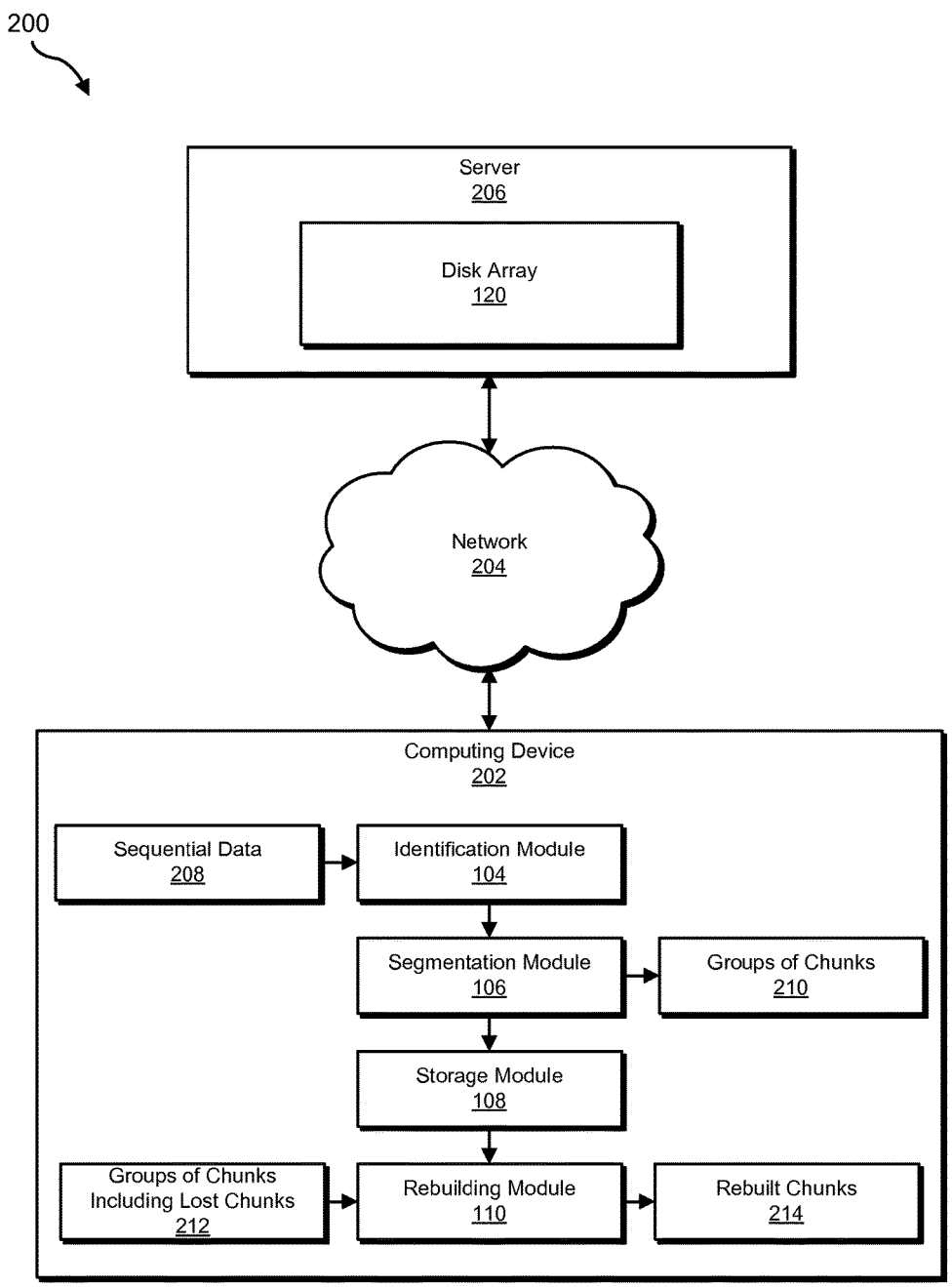
FIG. 2 is a block diagram of an additional exemplary system for decreasing RAID rebuilding time.

The following will provide, with reference to FIGS. 1-2, detailed descriptions of exemplary systems for decreasing RAID rebuilding time. Detailed descriptions of corresponding computer-implemented methods will also be provided in connection with FIGS. 3-9. In addition, detailed descriptions of an exemplary computing system and network architecture capable of implementing one or more of the embodiments described herein will be provided in connection with FIGS. 10 and 11, respectively.

FIG. 1 is a block diagram of an exemplary system 100 for decreasing RAID rebuilding time. As illustrated in this figure, exemplary system 100 may include one or more modules 102 for performing one or more tasks. For example, and as will be explained in greater detail below, exemplary system 100 may include an identification module 104 that may identify data for which there may be a need for physical integrity and high availability. Exemplary system 100 may also include a segmentation module 106 that may identify data for which there may be a need for physical integrity and high availability. Exemplary system 100 may additionally include a segmentation module 106 that may segment the data sequentially into a plurality of groups of chunks, with each group of chunks including redundant data sufficient to rebuild a lost chunk within the group of chunks.

In addition, and as will be described in greater detail below, exemplary system 100 may also include a storage module 108 that may stores the groups of chunks on a storage array according to a four-cycle-free bipartite storage map that, for each group of chunks, stores each chunk on a different device set within the storage array and, when a chunk within a group of chunks is lost, enables all other chunks within the group to be read in parallel from different devices within the storage array. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 1010 in FIG. 10, and/or portions of exemplary network architecture 1100 in FIG. 11. One or more of modules 102 in FIG. 1 may also represent all or portions of one or more special-purpose computers configured to perform one or more tasks.

As illustrated in FIG. 1, exemplary system 100 may also include one or more data stores, such as storage array 120. In one example, storage array 120 may be configured to store any sequential data, such as executable files or data files. Storage array 120 may represent portions of a single data store or computing device or a plurality of data stores or computing devices. For example, storage array 120 may represent a portion of server 206 in FIG. 2, computing system 1010 in FIG. 10, and/or portions of exemplary network architecture 1100 in FIG. 11. Alternatively, storage array 120 in FIG. 1 may represent one or more physically separate devices capable of being accessed by a computing device, such as server 206 in FIG. 2, computing system 1010 in FIG. 10, and/or portions of exemplary network architecture 1100 in FIG. 11.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in storage array 120. Additionally or alternatively, server 206 may be programmed with one or more of modules 102 and/or may store all or a portion of the data in storage array 120.

In one embodiment, one or more of modules 102 from FIG. 1 may, when executed by at least one processor of computing device 202 and/or server 206, enable computing device 202 and/or server 206 to decrease rebuilding time for a device in a storage array, following data loss. For example, and as will be described in greater detail below, one or more of modules 102, such as identification module 104, may cause computing device 202 and/or server 206 to identify sequential data 208 for which there is a need for physical integrity and high availability. Segmentation module 106 may be programmed to segment the data sequentially into a plurality of groups of chunks 210, with each group of chunks 210 including redundant data sufficient to rebuild a lost chunk within the group of chunks 210. Storage module 108 may be programmed to store the groups of chunks on storage array 120 according to a four-cycle-free bipartite storage map that, for each group of chunks, stores each chunk on a different device set within the storage array and, when a chunk within a group of chunks is lost, enables all other chunks within the group to be read in parallel from different devices within the storage array.

In one embodiment, modules 102 may include rebuilding module 110, which may be programmed to rebuild chunks lost due to failure of a single device within the storage array by (1) reading chunks from groups of chunks that include the lost chunks 212, in parallel from a plurality of devices within the storage array 120, (2) rebuilding the lost chunks by reversing parity calculations, and (3) writing the rebuilt chunks 214 in parallel to a plurality of devices within the storage array.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, storage array controllers, combinations of one or more of the same, exemplary computing system 1010 in FIG. 10, or any other suitable computing device.

Server 206 generally represents any type or form of computing device that is capable of receiving, storing, and retrieving chunks of data. Examples of server 206 include, without limitation, application servers, database servers, and storage controllers configured to provide various database or data storage services, and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), a storage area network (SAN), exemplary network architecture 1100 in FIG. 11, or the like. Network 204 may facilitate communication or data transfer using wireless or wired connections. In one embodiment, network 204 may facilitate communication between computing device 202 and server 206.

Figure 3:
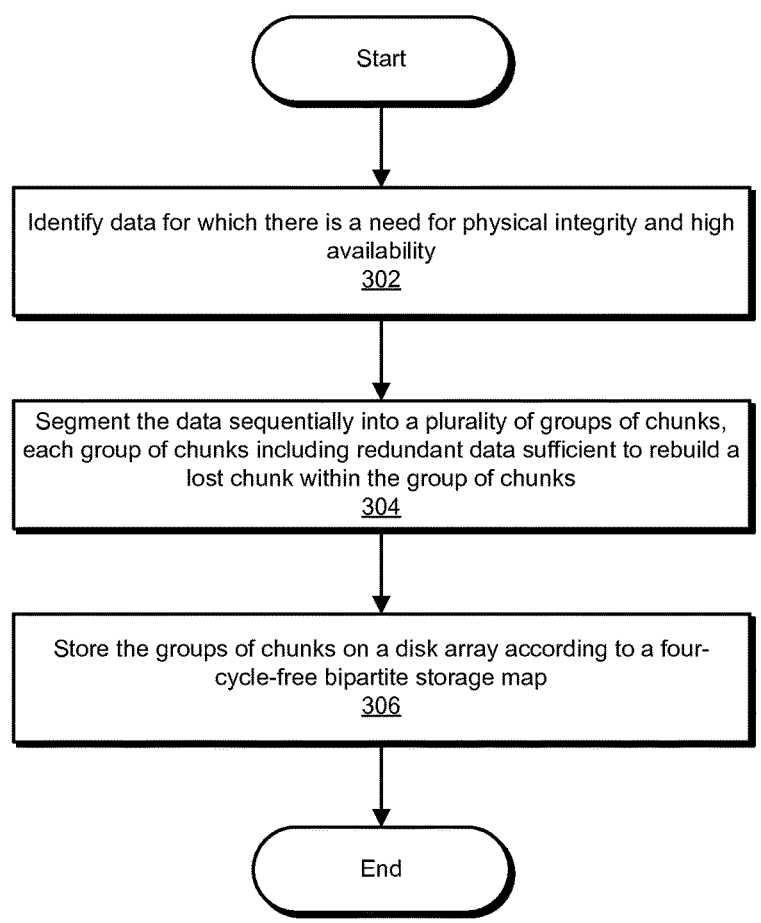
FIG. 3 is a flow diagram of an exemplary method for decreasing RAID rebuilding time.

FIG. 3 is a flow diagram of an exemplary computer-implemented method 300 for decreasing RAID rebuilding time. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 1010 in FIG. 10, and/or portions of exemplary network architecture 1100 in FIG. 11.

The phrase "storage array," as used herein, generally refers to a number of magnetic disk drives managed as a group, but may refer to a group of storage devices of another type. Storage arrays typically rely on redundant components, including controllers, fans, power supplies, and storage media, to provide increased availability, resiliency, and maintainability. Managed in various ways, storage arrays may become part of RAID arrays, storage area network (SAN) arrays, network attached storage (NAS) arrays, etc.

The term "RAID," or redundant array of inexpensive disks, as used herein, generally refers to a set of storage array configurations that employ the techniques of striping, mirroring, or parity to create large, reliable data stores from general purpose hard disk drives or other storage devices. RAID configurations are standardized in the Common RAID Disk Drive Format (DDF) standard by the Storage Network Industry Association.

As illustrated in FIG. 3, at step 302 one or more of the systems described herein may identify data for which there is a need for physical integrity and high availability. For example, at step 302 identification module 104 may, as part of computing device 202 in FIG. 2, identify sequential data 208 for which there is a need for physical integrity and high availability.

Identification module 104 may identify data for which there is a need for physical integrity and high availability in a number of ways. For example, data related to specific projects or users may be identified as critical to an operation and requiring high availability and a higher degree of protection from data loss. Identification module 104 may also identify critical data by data type. For example, user-created data may be considered to be more valuable than executable program files since executable programs may be easily reinstalled, while user-created data may be difficult to recreate. Critical data may also be identified by data usage patterns. Data frequently accessed may benefit from the high-availability of a RAID array, while seldom-accessed data could be migrated to less-accessible storage media. In some examples, the operation in which the RAID array is deployed may be considered critical, and therefore all available data would benefit from the data integrity and high availability provided by the RAID array.

At step 304, one or more of the systems described herein may segment the data sequentially into a plurality of groups of chunks, with each group of chunks including redundant data sufficient to rebuild a lost chunk within the group of chunks. For example, at step 304 segmentation module 106 may, as part of computing device 202 in FIG. 2, segment sequential data 208 sequentially into a plurality of groups of chunks, with each group of chunks 208 including redundant data sufficient to rebuild a lost chunk within the group of chunks 208.

The phrase "group of chunks," as used herein, generally refers to segments of logically sequential data, such as a file, stored on different physical storage devices. A group of chunks is sometimes referred to as a "stripe," although in some contexts a stripe may be distributed across all devices in a storage array, while a group of chunks may be stored only on a subset of devices in an array. "Striping," the technique of segmenting logically sequential data and storing it on separate storage devices, may result in faster data throughput because the process of writing data (and subsequently reading it) to storage devices such as magnetic disks is slow relative to the process of segmenting the data and issuing write requests for the segments. Similarly, the term "chunk" as used herein, generally refers to the data segments including a data stripe.

Figure 4:
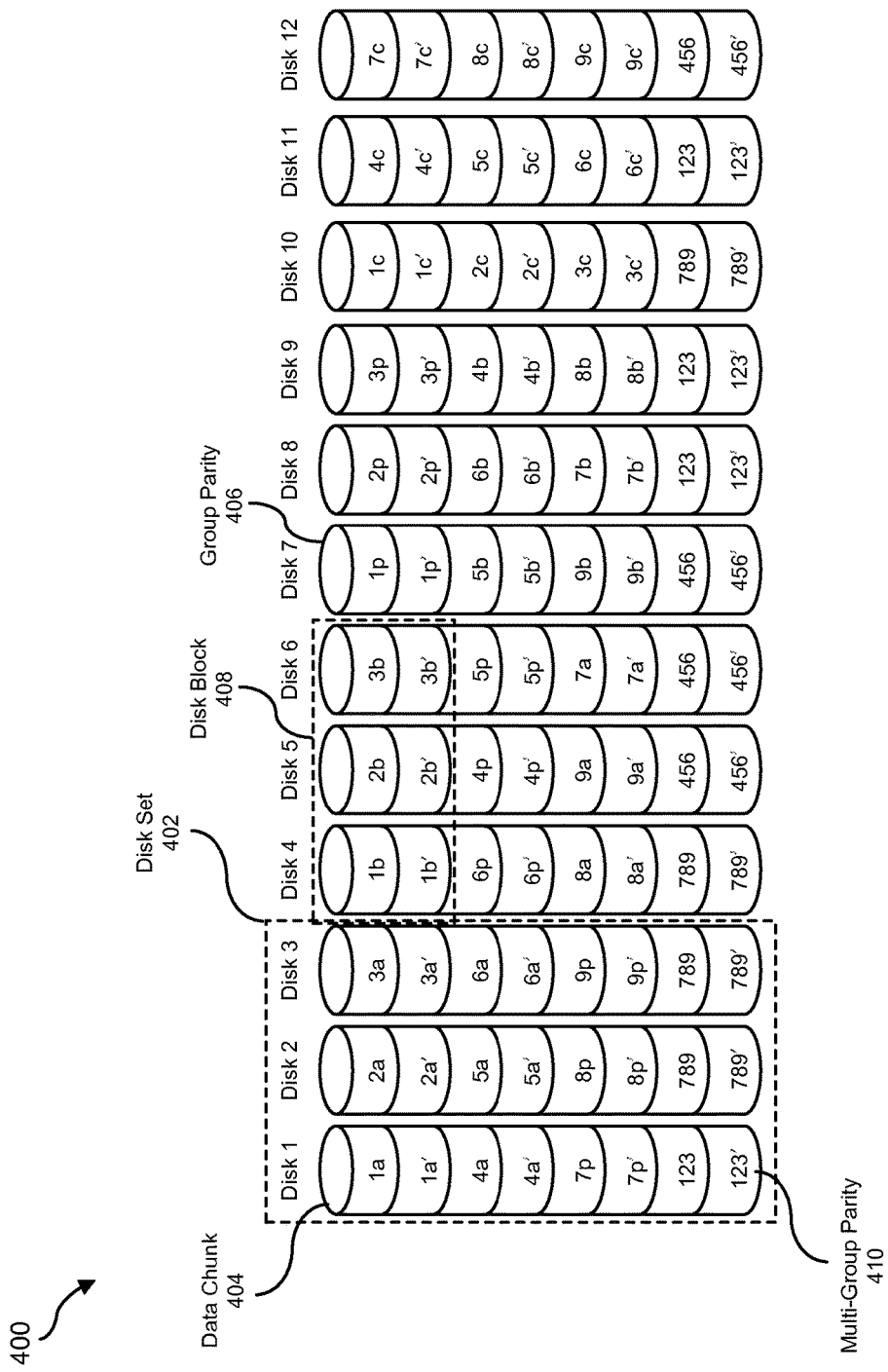
FIG. 4 is a block diagram illustrating several of the terms used throughout the descriptions of systems and methods described herein.

FIG. 4 illustrates an exemplary system 400 for decreasing RAID rebuilding time. As shown in FIG. 4, and as will be described in greater detail below, exemplary system 400 illustrates several of the terms used throughout the descriptions of the systems and methods described herein. Exemplary system 400 includes a RAID array of 12 disks, labeled Disk 1 through Disk 12. The storage array is divided into 4 sets of 3 disks each. Disk set 402, for example, includes Disk 1, Disk 2, and Disk 3. Each disk hosts several data chunks. Data chunk 404 is the data chunk labeled 1a on Disk 1. Data chunk 404 may be a chunk of the group of chunks labeled 1a, 1b, 1c, and 1p. As will be described in greater detail below, group parity 406, the chunk labeled 1p, is the group parity chunk for the group of chunks 1a, 1b, and 1c. The data blocks labeled 1a', 1b', and 1c' are data chunks subsequent to chunks 1a, 1b, and 1c, respectively. Data chunk 1p' is the parity chunk for the group of chunks 1a', 1b', and 1c'. Disk block 408 is a block of consecutive chunks within a disk set. Multi-group parity 410 is the chunk labeled 123', which represents a parity chunk for groups 1', 2', and 3'.

Segmentation module 106 may segment the data sequentially into a plurality of groups of chunks in a number of ways. For example, segmentation module 106 may divide the storage array into a various number of device sets, including a various number of devices, depending upon the total number of devices in the storage array. Chunk size may be set according to various criteria, such as the type of data to be stored on the storage array. For example, maximum throughput for large data files, such as video data, may be achieved using a smaller chunk size, so that the data is spread across a greater number of drives, and reading data in parallel is used to greater advantage. Data that is to be read in smaller amounts in a single read, such as for a database or email server, may benefit from a larger chunk size, so that data is more likely to be read in a single operation, minimizing seek time.

The term "seek," as used herein, generally refers to the process of positioning the read/write head of a disk drive to the location on the disk where data is to be read or written. More generally, the term refers to the process of locating data on a storage device to begin a read/write operation. The average time to perform a seek across all possible positions on a device is referred to as the "seek time" for the device.

In some examples, the systems described herein may include storing at least two chunks in sequence on a device within the storage array to enable the chunks to be read in sequence using a single seek. As depicted in FIG. 4, disk block 408 includes chunks 1b and 1b'. Chunks 1b and 1b' are sequential data stored sequentially on Disk 4, so that both chunks may be read using a single seek. Likewise, chunks 2b and 2b' on Disk 5, and chunks 3b and 3b' on Disk 6, are sequential chunks that may be read using a single seek. Including two or more chunks in a disk block may have the effect of using a larger chunk size, and therefore reducing seek time, for larger groups of chunks, while still taking advantage of reading chunks in parallel for smaller groups of chunks.

In one embodiment, the redundant data may include calculated parity data for the group of chunks. The term "parity," as used herein, generally refers to the result of a computation that may be reversed to reconstruct lost data. As will be discussed in greater detail below, in its simplest form, parity may be the exclusive or (XOR) of data across a group of chunks.

Figure 5:
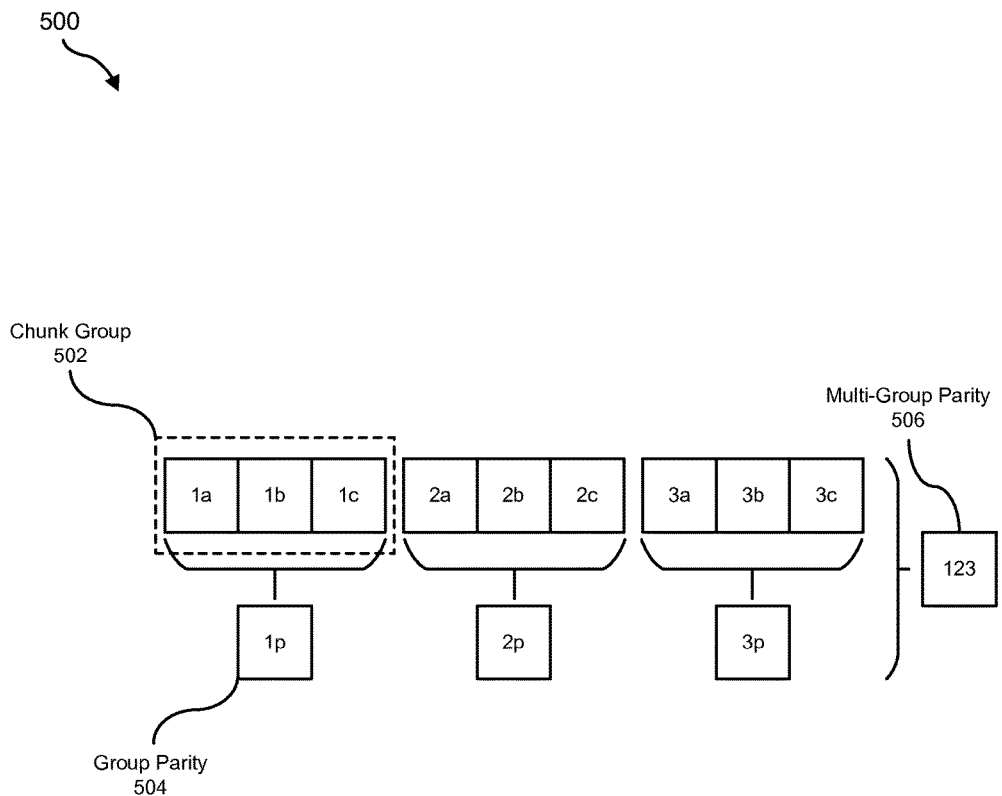
FIG. 5 is a block diagram of an exemplary system for calculating parity that may be used in accordance with systems and methods described herein.

FIG. 5 illustrates an exemplary system for calculating parity 500 that may be used in accordance with the systems and methods for decreasing RAID rebuilding time described herein. As depicted in FIG. 5, chunk group 502 includes chunks labeled 1a, 1b, and 1c. Group parity 504 may be the calculated result of an exclusive-or operation across the data in chunks 1a, 1b, and 1c.

In one embodiment, a plurality of groups of chunks may include additional redundant data sufficient to rebuild two lost chunks within the group of chunks. As depicted in FIG. 5, group parity chunk 504 may be used to rebuild chunk group 502 if one of the chunks is lost. For example, in FIG. 4, chunk 1a is stored on Disk 1, chunk 1b is stored on Disks 1 and 4, and chunk 1c is stored on Disks 4 and 10. If Disk 1 fails, chunks 1b, 1c, and 1p are available to rebuild chunk group 502. However, if both Disk 1 and Disk 4 fail, only chunks 1c and 1p from chunk group 502 will be available, insufficient to rebuild chunk group 502. Additional redundant data is required to rebuild chunk group 502.

In one embodiment, the additional redundant data may include calculated parity data for a plurality of groups of chunks. As shown in FIG. 5, multi-group parity 506 is a calculated parity chunk encoding chunk groups 1, 2, and 3, including the group parity blocks for each chunk group. Although referred to as a parity block, multi-group parity 506 may use a different encoding scheme than the simple exclusive-or (XOR) used to calculate group parity 504. For example, multi-group parity 506 may encode a set of chunk groups using maximum distance separable (MDS) encoding, such as Reed-Solomon code.

Returning to FIG. 3, at step 306 one or more of the systems described herein may store the groups of chunks on a storage array according to a four-cycle-free bipartite storage map that, for each group of chunks, stores each chunk on a different device set within the storage array and, when a chunk within a group of chunks is lost, enables all other chunks within the group to be read in parallel from different devices within the storage array. For example, at step 306 storage module 108 may, as part of computing device 202 in FIG. 2, store the groups of chunks on a storage array according to a four-cycle-free bipartite storage map.

The term "four-cycle-free bipartite storage map," as used herein, generally refers to a technique for selecting to which device in a storage array each chunk in a group of chunks is to be written. As will be described in greater detail below, the mapping of chunks to devices is conducted to assure that chunks from two groups of chunks are not stored on the same two devices, i.e., the mapping is four-cycle-free.

Figure 6:
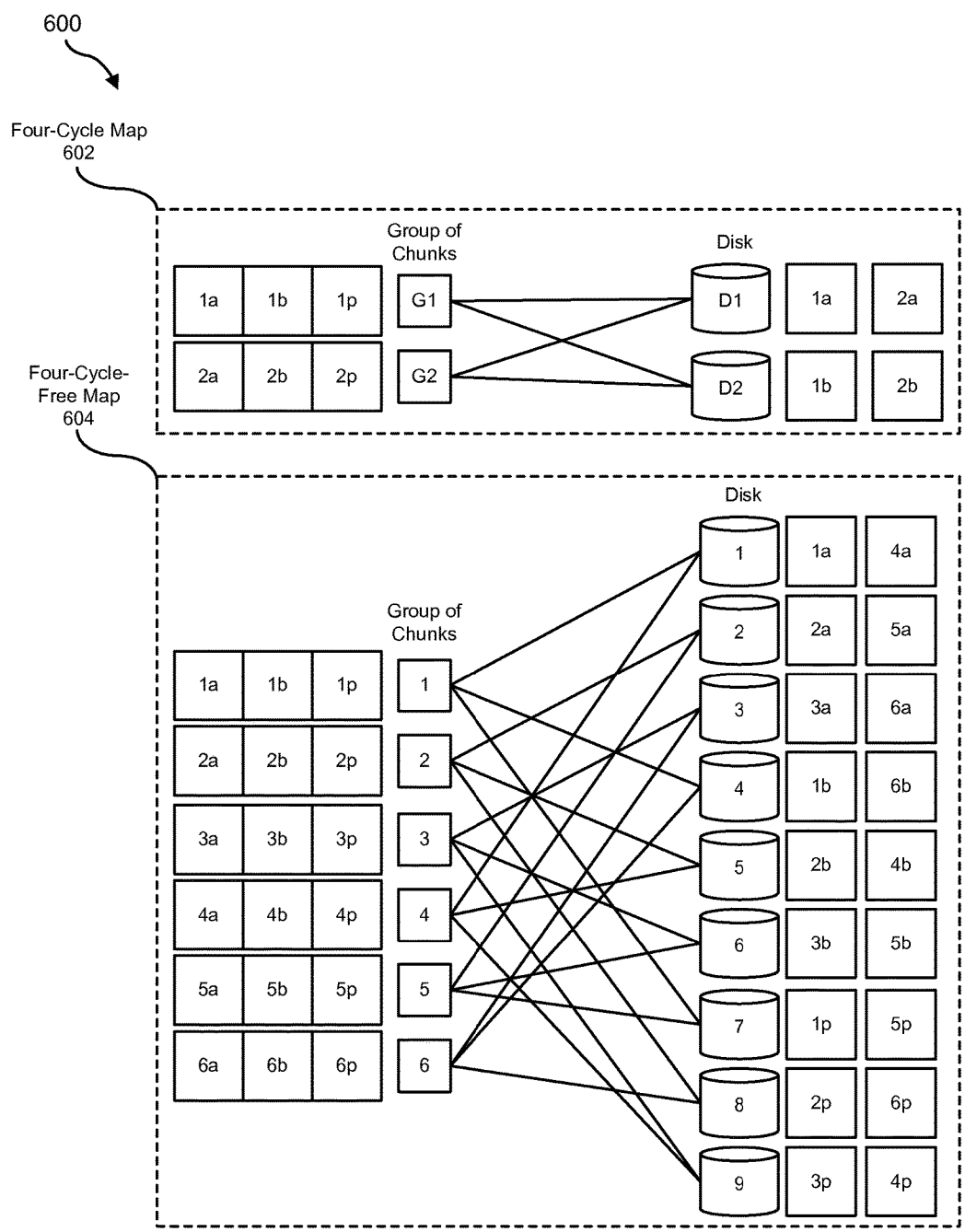
FIG. 6 is a block diagram of an exemplary system for mapping chunks in a group of chunks to devices in a storage array according to a four-cycle-free bipartite storage map that may be used in accordance with systems and methods described herein.

FIG. 6 illustrates an exemplary system 600 for mapping chunks in a group of chunks to devices in a storage array according to a four-cycle-free bipartite storage map that may be used in accordance with the systems and methods described herein. FIG. 6 includes four-cycle map 602 that illustrates a mapping of chunks from a group of chunks to devices in a storage array that includes a four-cycle. In four-cycle map 602, chunks 1*a* and 2*a* are stored on disk 1, and chunks 1*b* and 2*b* are stored on disk 2. The mapping of chunks to disks, represented by the lines connecting the group number to the disk number, includes the four-cycle G1, D1, G2, D2, G1.

Four-cycle-free map 604 illustrates a mapping of chunks from 6 groups of chunks to 9 disks in a four-cycle-free bipartite map. Storage module 108 may store the groups of chunks on a storage array according to a four-cycle-free bipartite storage map in various ways. In one example, storage module 108 may verify that the mapping of chunks to disks is four-cycle-free by calculating the eigenvalues of the adjacency matrix of the bipartite map.

In some examples, the systems described herein may include rebuilding chunks lost due to failure of a single disk within the storage array by (1) reading, in parallel from a plurality of devices within the storage array, chunks from groups of chunks that include the lost chunks, (2) rebuilding the lost chunks by reversing parity calculations, and (3) writing, in parallel to a plurality of devices within the storage array, the rebuilt chunks to different devices within the storage array. For example, as part of computing device 202 in FIG. 2, rebuilding module 110 may read, in parallel from storage array 120, groups of chunks including lost chunks 212, rebuild the lost chunks by reversing parity calculations to create rebuilt chunks 214, and write the rebuilt chunks 214 to different devices within storage array 120.

The phrases "reading in parallel" and "writing in parallel," as used herein, generally refer to simultaneously reading or writing multiple chunks from different devices in a storage array. As will be appreciated, reading and writing chunks in parallel may increase data throughput.

Figure 7:
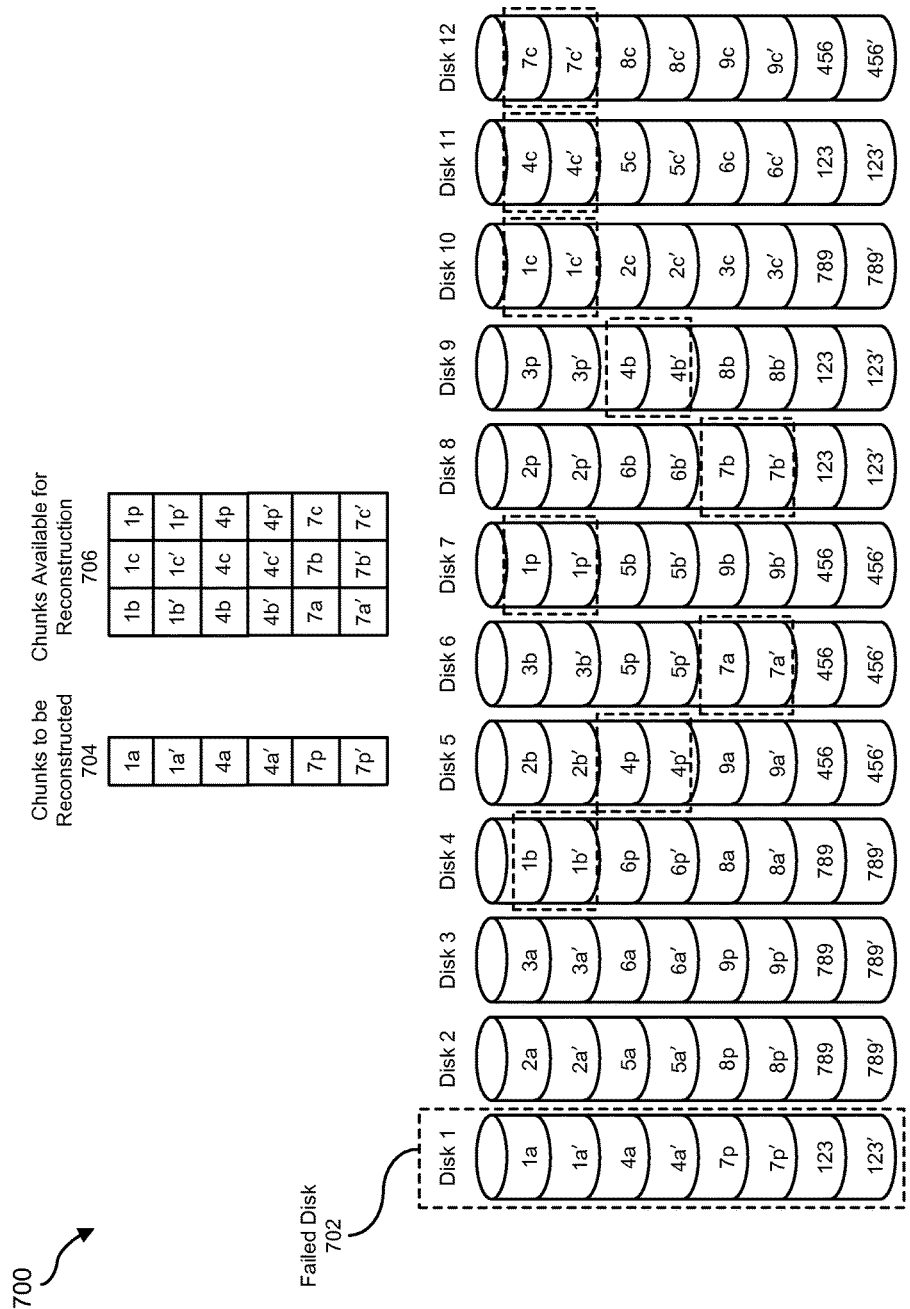
FIG. 7 is a block diagram of an exemplary system for rebuilding chunks lost due to device failure that may be used in accordance with systems and methods disclosed herein.
Figure 8:
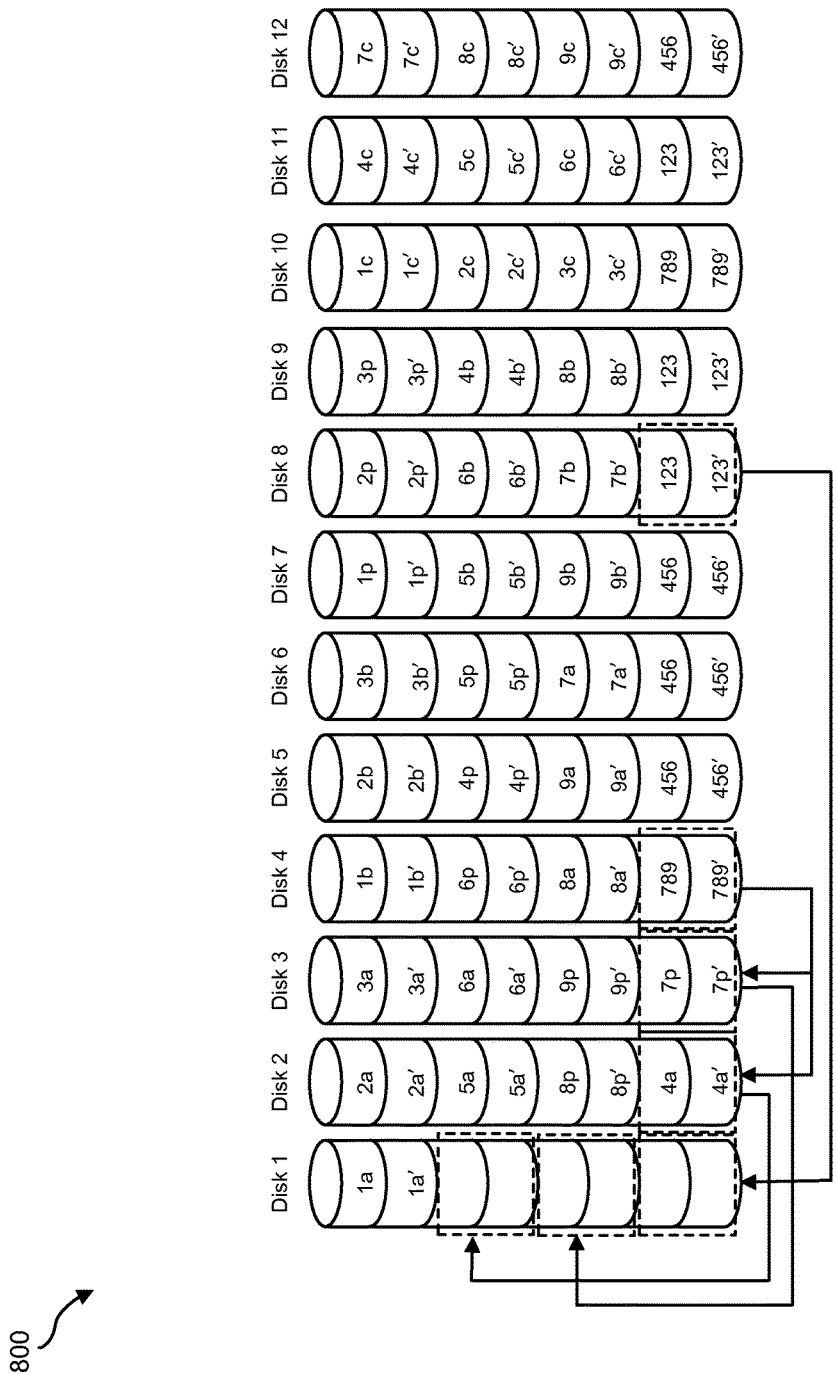
FIG. 8 is a block diagram of an exemplary system for rebuilding chunks lost due to device failure that may be used in accordance with systems and methods disclosed herein.

FIG. 7 and FIG. 8 illustrate exemplary systems 700 and 800 for rebuilding chunks lost due to device failure that may be used in accordance with systems and methods disclosed herein. FIG. 7 depicts a storage array with failed disk 702, labeled Disk 1. Chunks written to failed disk 702 included 1*a*, 1*a'*, 4*a*, 4*a'*, parity chunks 7*p* and 7*p'*, and multi-group parity chunks 123 and 123'. Because some of these chunks were also written to other disks in the storage array, chunks to be reconstructed 704 include only 1*a*, 1*a'* 4*a*, 4*a'*, 7*p* and 7*p'*. Chunks available for reconstruction 706 include chunks 1*b*, 1*c* and 1*p* (which are sufficient to reconstruct chunk 1*a*), chunks 1*b'*, 1*c'* and 1*p'* (which are sufficient to reconstruct chunk 1*a'*), chunks 4*b*, 4*c* and 4*p* (which are sufficient to reconstruct 4*a*), chunks 4*b'*, 4*c'* and 4*p'* (which are sufficient to reconstruct 4*a'*), chunks 7*a*, 7*b*, and 7*c* (which are sufficient to recalculate group parity chunk 7*p*), and chunks 7*a'*, 7*b'*, and 7*c'* (which are sufficient to recalculate group parity chunk 7*p'*).

Rebuilding module 110 may rebuild lost chunks due to failure of a single device in a storage array in various ways. In some examples, reading chunks from the groups of chunks that include the lost chunks may include reading a plurality of chunks in sequence from a device within the storage array after a single seek. For example, as illustrated in FIG. 7, rebuilding module may read sequential chunks 1*b* and 1*b'* after a single seek because the chunks were written sequentially on Disk 4. Likewise, chunks 4*b* and 4*b'* may be read from Disk 9 after a single seek, and chunks 7*a* and 7*a'* may be read from Disk 6 after a single seek. As detailed below, reducing seek time may result in an overall reduction in the time required to rebuild a failed device.

Rebuilding module 110 may reconstruct chunks from a failed device in various ways. In some examples, rebuilding module 110 may write rebuilt chunks to unused sectors of devices in the storage array. In addition, rebuilding module 110 may overwrite redundant data within the storage array with the rebuilt chunks. For example, as illustrated in FIG. 7, chunks to be reconstructed 704 may be written to areas of different devices in the storage array that contain redundant data. As shown in FIG. 8, chunks 1*a* and 1*a'* may be written to Disk 1, which replaced failed disk 702 in FIG. 7. To avoid writing rebuilt chunks to the same disk as chunk 1*a*, rebuilt chunks 4*a* and 4*a'* may be written to Disk 2 and rebuilt chunks 7*p* and 7*p'* may be written to Disk 3, overwriting redundant copies of multi-group parity chunks 789 and 789'. Writing the rebuilt chunks to different devices enables the storage array to write the chunks in parallel, which may result in faster write times than writing all chunks to a single device. By reducing write times, less time may be required to rebuild the failed device.

In some examples, the systems described herein may include copying the rebuilt chunks to locations specified by the storage map. After chunks lost due to a device failure have been rebuilt, rebuilding module 110 may copy the rebuilt chunks to their original positions on the replaced device according to the storage map. In the example shown in FIG. 8, chunks 1*a* and 1*a'* have already been written to their original positions on Disk 1. Chunks 4*a*, 4*a'*, 7*p*, and 7*p'* may be copied from Disks 2 and 3, where they were written after being rebuilt. Although multi-group parity chunks 123 and 123' were on the failed device, redundant copies were available elsewhere in the storage array. In the example shown in FIG. 8, due to the four-cycle-free storage map and writing rebuilt chunks to separate devices, chunks needed to rebuild Disk 1 may be read in parallel from separate devices, which may reduce the amount of time required to rebuild the failed device.

Figure 9:
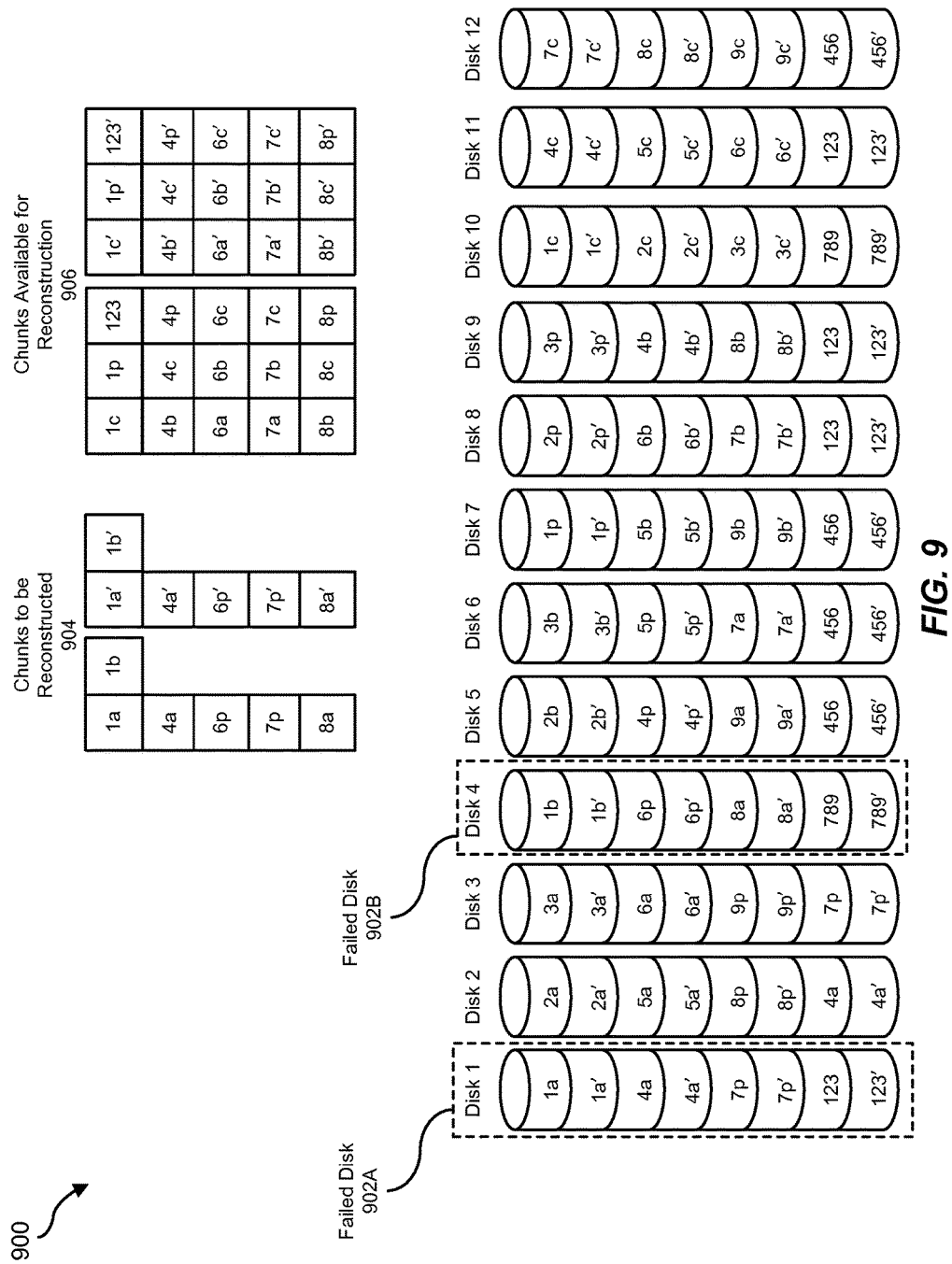
FIG. 9 is a block diagram of an exemplary system for rebuilding chunks lost due to device failure that may be used in accordance with systems and methods disclosed herein.

Including multi-group parity chunks in the storage map may enable lost chunks to be rebuilt after the failure of two devices in the storage array. In some examples, the systems described herein may include rebuilding chunks lost due to failure of two devices within the storage array in a similar manner to rebuilding chunks lost due to failure of a single device within the storage array. FIG. 9 illustrates exemplary systems 900 for rebuilding chunks lost due to failure of two devices that may be used in accordance with systems and methods disclosed herein.

To rebuild chunks lost after failure of two devices, rebuilding module 110 may begin by reading, in parallel from a plurality of devices within the storage array, chunks from groups of chunks that include the lost chunks. For example, as shown in FIG. 9, failure of failed disk 902*a* and failed disk 902*b* may result in the need to reconstruct chunks to be reconstructed 904, including 1*a*, 1*a'*, 1*b*, 1*b'* 4*a*, 4*a'*, 6*p*, 6*p'*, 7*p*, 7*p'*, 8*a*, and 8*a'*. Chunks available for reconstruction 906 include chunks 1*c*, 1*p*, and multi-group parity chunk 123 for group 1, chunks 1*c'*, 1*p'*, and multi-group parity chunk 123' for group 1', chunks 4*b*, 4*c*, and 4*p* for group 4, chunks 4*b'*, 4*c'*, and 4*p'* for group 4', chunks 6*a*, 6*b*, and 6*c* for group 6, chunks 6*a'*, 6*b'*, and 6*c'* for group 6', chunks 7*a*, 7*b*, and 7*c* for group 7, chunks 7*a'*, 7*b'*, and 7*c'* for group 7', chunks 8*b*, 8*c*, and 8*p* for group 8, and chunks 8*b'*, 8*c'*, and 8*p'* for group 8'. In the example shown, one parallel read can retrieve all the chunks available for reconstruction 906, except chunks 8*b* and 8*b'*, which are on Disk 9 with chunks 4*b* and 4*b'*. Sequential chunks may also be read after a single seek in the cases of chunks 4*b* and 4*b'*, 6*a* and 6*a'*, 7*a* and 7*a'*, and 8*b* and 8*b'*.

After chunks available for reconstruction 906 have been read from the storage array, rebuilding module 110 may proceed by rebuilding single lost chunks from the groups of chunks that include the lost chunks by reversing parity calculations. In the example shown in FIG. 9, chunk $4a$ may be rebuilt by reversing the parity calculation using chunks $4b$, $4c$, and $4p$. Chunk $4a'$ may be rebuilt by reversing the parity calculation using chunks $4b'$, $4c'$, and $4p'$. Chunk $8a$ may be rebuilt by reversing the parity calculation using chunks $8b$, $8c$, and $8p$. Chunk $8a'$ may be rebuilt by reversing the parity calculation using chunks $8b'$, $8c'$, and $8p'$. In addition, parity chunks $6p$, $6p'$, $7p$, and $7p'$ and be rebuilt by repeating the parity calculation originally used to create them using the groups of chunks $6a$, $6b$, $6c$; $6a'$, $6b'$, $6c'$; $7a$, $7b$, $7c$; and $7a'$, $7b'$, $7c'$.

Rebuilding module 110 may rebuild lost chunks from groups of chunks that lost a plurality of chunks by reversing parity calculations using calculated parity data for a plurality of groups of chunks. Because two chunks ($1a$ and $1b$) were lost from group 1 in the example shown in FIG. 9, and two chunks ($1a'$ and $1b'$) were lost from group 1', rebuilding the lost chunks may include reversing the multi-group parity calculation used to create multi-group parity chunks 123 and 123'. To do so, rebuilding module 110 may retrieve all the available chunks in groups 1, 2, and 3, and 1', 2', and 3', including the parity chunks for each group. All of these chunks are available, except for the two lost chunks from each group, $1a$, and $1b$, and $1a'$ and $1b'$. Rebuilding module 110 may then reverse the calculation used to create multi-group parity chunks 123 and 123' to rebuild chunks $1a$, $1a'$, $1b$, and $1b'$.

Once rebuilding module 110 has rebuilt all chunks to be reconstructed 904, rebuilding module 110 may write the rebuilt chunks in parallel to different devices within the storage array. As with the process for rebuilding chunks lost after a single device failure, writing the rebuilt chunks to different devices may provide the time savings provided by writing chunks in parallel, and then again when subsequently reading the chunks in parallel when they are to be copied to the replaced devices.

As explained above, by making use of novel parity and chunk placement schemes, RAID rebuilding time may be decreased significantly. Tests of a prototype storage array decreased the rebuild time by a factor of three over a RAID 6 array. The parity scheme may require fewer blocks than RAID 6 to recover lost data, and fewer devices may need to be accessed during the rebuild process. Use of a four-cycle-free bipartite storage graph may assure that groups of chunks that include lost data are on different device sets, and that reads and writes may proceed in parallel to rebuild the lost data. Placing sequential chunks in sequence on the same device may reduce random device access during the rebuild process.

Figure 10:
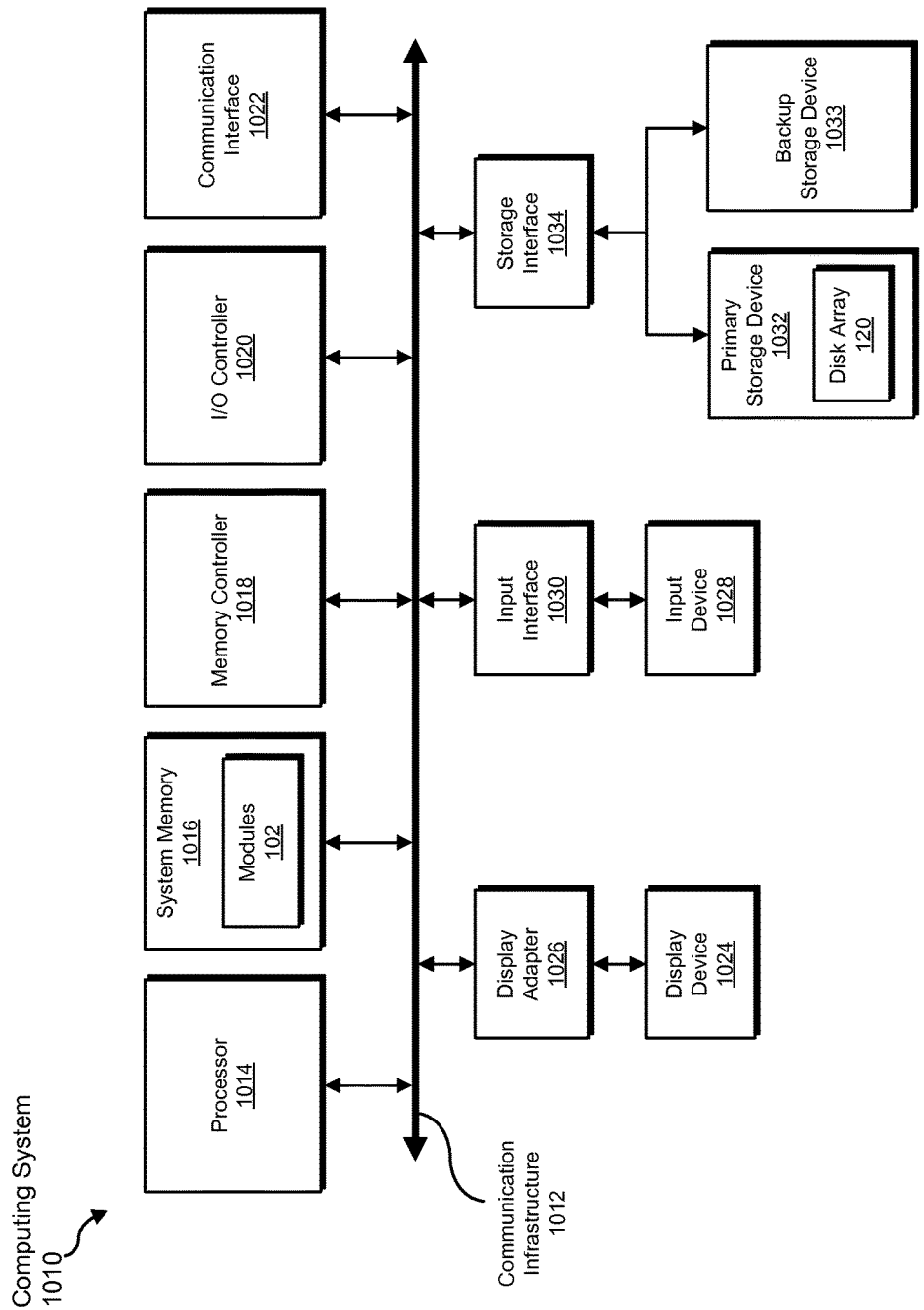
FIG. 10 is a block diagram of an exemplary computing system capable of implementing one or more of the embodiments described and/or illustrated herein.

FIG. 10 is a block diagram of an exemplary computing system 1010 capable of implementing one or more of the embodiments described and/or illustrated herein. For example, all or a portion of computing system 1010 may perform and/or be a means for performing, either alone or in combination with other elements, one or more of the steps described herein (such as one or more of the steps illustrated in FIG. 3). All or a portion of computing system 1010 may also perform and/or be a means for performing any other steps, methods, or processes described and/or illustrated herein.

Computing system 1010 broadly represents any single or multi-processor computing device or system capable of executing computer-readable instructions. Examples of computing system 1010 include, without limitation, workstations, laptops, client-side terminals, servers, distributed computing systems, handheld devices, or any other computing system or device. In its most basic configuration, computing system 1010 may include at least one processor 1014 and a system memory 1016.

Processor 1014 generally represents any type or form of physical processing unit (e.g., a hardware-implemented central processing unit) capable of processing data or interpreting and executing instructions. In certain embodiments, processor 1014 may receive instructions from a software application or module. These instructions may cause processor 1014 to perform the functions of one or more of the exemplary embodiments described and/or illustrated herein.

System memory 1016 generally represents any type or form of volatile or non-volatile storage device or medium capable of storing data and/or other computer-readable instructions. Examples of system memory 1016 include, without limitation, Random Access Memory (RAM), Read Only Memory (ROM), flash memory, or any other suitable memory device. Although not required, in certain embodiments computing system 1010 may include both a volatile memory unit (such as, for example, system memory 1016) and a non-volatile storage device (such as, for example, primary storage device 1032, as described in detail below). In one example, one or more of modules 102 from FIG. 1 may be loaded into system memory 1016.

In certain embodiments, exemplary computing system 1010 may also include one or more components or elements in addition to processor 1014 and system memory 1016. For example, as illustrated in FIG. 10, computing system 1010 may include a memory controller 1018, an Input/Output (I/O) controller 1020, and a communication interface 1022, each of which may be interconnected via a communication infrastructure 1012. Communication infrastructure 1012 generally represents any type or form of infrastructure capable of facilitating communication between one or more components of a computing device. Examples of communication infrastructure 1012 include, without limitation, a communication bus (such as an Industry Standard Architecture (ISA), Peripheral Component Interconnect (PCI), PCI Express (PCIe), or similar bus) and a network.

Memory controller 1018 generally represents any type or form of device capable of handling memory or data or controlling communication between one or more components of computing system 1010. For example, in certain embodiments memory controller 1018 may control communication between processor 1014, system memory 1016, and I/O controller 1020 via communication infrastructure 1012.

I/O controller 1020 generally represents any type or form of module capable of coordinating and/or controlling the input and output functions of a computing device. For example, in certain embodiments I/O controller 1020 may control or facilitate transfer of data between one or more elements of computing system 1010, such as processor 1014, system memory 1016, communication interface 1022, display adapter 1026, input interface 1030, and storage interface 1034.

Communication interface 1022 broadly represents any type or form of communication device or adapter capable of facilitating communication between exemplary computing system 1010 and one or more additional devices. For example, in certain embodiments communication interface 1022 may facilitate communication between computing system 1010 and a private or public network including additional computing systems. Examples of communication interface 1022 include, without limitation, a wired network interface (such as a network interface card), a wireless network interface (such as a wireless network interface card), a modem, and any other suitable interface. In at least one embodiment, communication interface 1022 may provide a direct connection to a remote server via a direct link to a network, such as the Internet. Communication interface 1022 may also indirectly provide such a connection through, for example, a local area network (such as an Ethernet network), a personal area network, a telephone or cable network, a cellular telephone connection, a satellite data connection, or any other suitable connection.

In certain embodiments, communication interface 1022 may also represent a host adapter configured to facilitate communication between computing system 1010 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 1022 may also allow computing system 1010 to engage in distributed or remote computing. For example, communication interface 1022 may receive instructions from a remote device or send instructions to a remote device for execution.

As illustrated in FIG. 10, computing system 1010 may also include at least one display device 1024 coupled to communication infrastructure 1012 via a display adapter 1026. Display device 1024 generally represents any type or form of device capable of visually displaying information forwarded by display adapter 1026. Similarly, display adapter 1026 generally represents any type or form of device configured to forward graphics, text, and other data from communication infrastructure 1012 (or from a frame buffer, as known in the art) for display on display device 1024.

As illustrated in FIG. 10, exemplary computing system 1010 may also include at least one input device 1028 coupled to communication infrastructure 1012 via an input interface 1030. Input device 1028 generally represents any type or form of input device capable of providing input, either computer or human generated, to exemplary computing system 1010. Examples of input device 1028 include, without limitation, a keyboard, a pointing device, a speech recognition device, or any other input device.

As illustrated in FIG. 10, exemplary computing system 1010 may also include a primary storage device 1032 and a backup storage device 1033 coupled to communication infrastructure 1012 via a storage interface 1034. Storage devices 1032 and 1033 generally represent any type or form of storage device or medium capable of storing data and/or other computer-readable instructions. For example, storage devices 1032 and 1033 may be a magnetic disk drive (e.g., a so-called hard drive), a solid state drive, a floppy disk drive, a magnetic tape drive, an optical disk drive, a flash drive, or the like. Storage interface 1034 generally represents any type or form of interface or device for transferring data between storage devices 1032 and 1033 and other components of computing system 1010. In one example, storage array 120 from FIG. 1 may be stored in primary storage device 1032.

In certain embodiments, storage devices 1032 and 1033 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 1032 and 1033 may also include other similar structures or devices for allowing computer software, data, or other computer-readable instructions to be loaded into computing system 1010. For example, storage devices 1032 and 1033 may be configured to read and write software, data, or other computer-readable information. Storage devices 1032 and 1033 may also be a part of computing system 1010 or may be a separate device accessed through other interface systems.

Many other devices or subsystems may be connected to computing system 1010. Conversely, all of the components and devices illustrated in FIG. 10 need not be present to practice the embodiments described and/or illustrated herein. The devices and subsystems referenced above may also be interconnected in different ways from that shown in FIG. 10. Computing system 1010 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 1010. All or a portion of the computer program stored on the computer-readable medium may then be stored in system memory 1016 and/or various portions of storage devices 1032 and 1033. When executed by processor 1014, a computer program loaded into computing system 1010 may cause processor 1014 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 1010 may be configured as an Application Specific Integrated Circuit (ASIC) adapted to implement one or more of the exemplary embodiments disclosed herein.

Figure 11:
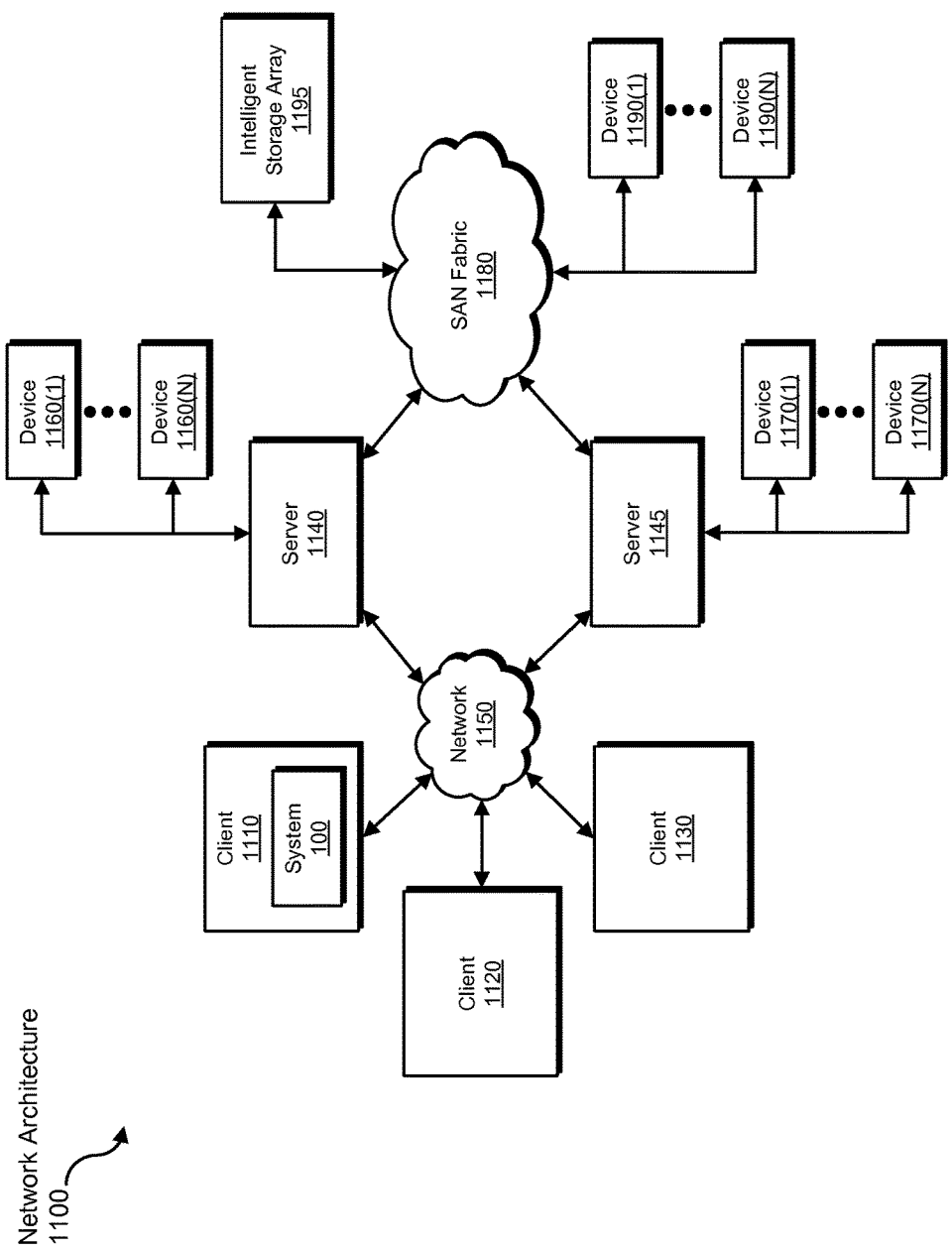
FIG. 11 is a block diagram of an exemplary computing network capable of implementing one or more of the embodiments described and/or illustrated herein.

FIG. 11 is a block diagram of an exemplary network architecture 1100 in which client systems 1110, 1120, and 1130 and servers 1140 and 1145 may be coupled to a network 1150. As detailed above, all or a portion of network architecture 1100 may perform and/or be a means for performing, either alone or in combination with other elements, one or more of the steps disclosed herein (such as one or more of the steps illustrated in FIG. 3). All or a portion of network architecture 1100 may also be used to perform and/or be a means for performing other steps and features set forth in the instant disclosure.

Client systems 1110, 1120, and 1130 generally represent any type or form of computing device or system, such as exemplary computing system 1010 in FIG. 10. Similarly, servers 1140 and 1145 generally represent computing devices or systems, such as application servers or database servers, configured to provide various database services and/or run certain software applications. Network 1150 generally represents any telecommunication or computer network including, for example, an intranet, a WAN, a LAN, a PAN, or the Internet. In one example, client systems 1110, 1120, and/or 1130 and/or servers 1140 and/or 1145 may include all or a portion of system 100 from FIG. 1.

As illustrated in FIG. 11, one or more storage devices 1160(1)-(N) may be directly attached to server 1140. Similarly, one or more storage devices 1170(1)-(N) may be directly attached to server 1145. Storage devices 1160(1)-(N) and storage devices 1170(1)-(N) generally represent any type or form of storage device or medium capable of storing data and/or other computer-readable instructions. In certain embodiments, storage devices 1160(1)-(N) and storage devices 1170(1)-(N) may represent Network-Attached Storage (NAS) devices configured to communicate with servers 1140 and 1145 using various protocols, such as Network File System (NFS), Server Message Block (SMB), or Common Internet File System (CIFS).

Servers 1140 and 1145 may also be connected to a Storage Area Network (SAN) fabric 1180. SAN fabric 1180 generally represents any type or form of computer network or architecture capable of facilitating communication between a plurality of storage devices. SAN fabric 1180 may facilitate communication between servers 1140 and 1145 and a plurality of storage devices 1190(1)-(N) and/or an intelligent storage array 1195. SAN fabric 1180 may also facilitate, via network 1150 and servers 1140 and 1145, communication between client systems 1110, 1120, and 1130 and storage devices 1190(1)-(N) and/or intelligent storage array 1195 in such a manner that devices 1190(1)-(N) and array 1195 appear as locally attached devices to client systems 1110, 1120, and 1130. As with storage devices 1160(1)-(N) and storage devices 1170(1)-(N), storage devices 1190(1)-(N) and intelligent storage array 1195 generally represent any type or form of storage device or medium capable of storing data and/or other computer-readable instructions.

In certain embodiments, and with reference to exemplary computing system 1010 of FIG. 10, a communication interface, such as communication interface 1022 in FIG. 10, may be used to provide connectivity between each client system 1110, 1120, and 1130 and network 1150. Client systems 1110, 1120, and 1130 may be able to access information on server 1140 or 1145 using, for example, a web browser or other client software. Such software may allow client systems 1110, 1120, and 1130 to access data hosted by server 1140, server 1145, storage devices 1160(1)-(N), storage devices 1170(1)-(N), storage devices 1190(1)-(N), or intelligent storage array 1195. Although FIG. 11 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 1140, server 1145, storage devices 1160 (1)-(N), storage devices 1170(1)-(N), storage devices 1190 (1)-(N), intelligent storage array 1195, or any combination thereof. All or a portion of one or more of the exemplary embodiments disclosed herein may also be encoded as a computer program, stored in server 1140, run by server 1145, and distributed to client systems 1110, 1120, and 1130 over network 1150.

As detailed above, computing system 1010 and/or one or more components of network architecture 1100 may perform and/or be a means for performing, either alone or in combination with other elements, one or more steps of an exemplary method for decreasing RAID rebuilding time.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may receive data to be transformed, transform the data, and store the result of the transformation to a RAID array. One or more of the modules recited herein may also transform a computing device into a device for data storage. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for decreasing RAID rebuilding time, at least a portion of the method being performed by a computing device comprising at least one processor, the method comprising:
    identifying data for which there is a need for physical integrity and high availability;
    segmenting the data sequentially into a plurality of groups of chunks, each group of chunks comprising redundant data sufficient to rebuild a lost chunk within the group of chunks;
    storing the groups of chunks on a storage array according to a four-cycle-free bipartite storage map that:
        for each group of chunks, stores each chunk on a different device set within the storage array;
        when a chunk within a group of chunks is lost, enables all other chunks within the group to be read in parallel from different devices within the storage array;
    prior to storing a group of chunks, verifying that the mapping of the group of chunks is four-cycle-free by calculating the eigenvalues of the adjacency matrix of the bipartite storage map.

2. The computer-implemented method of claim 1, further comprising storing at least two chunks in sequence on a device within the storage array to enable the chunks to be read in sequence using a single seek.

3. The computer-implemented method of claim 1, wherein the redundant data comprises calculated parity data for the group of chunks.

4. The computer-implemented method of claim 1, wherein the plurality of groups of chunks further comprises additional redundant data sufficient to rebuild two lost chunks within the group of chunks.

5. The computer-implemented method of claim 4, wherein the additional redundant data comprises calculated parity data for the plurality of groups of chunks.

6. The computer-implemented method of claim 1, further comprising rebuilding chunks lost due to failure of a single device within the storage array by:
- reading chunks from groups of chunks that include the lost chunks in parallel from a plurality of devices within the storage array;
- rebuilding the lost chunks by reversing parity calculations;
- writing the rebuilt chunks in parallel to a plurality of devices within the storage array.

7. The computer-implemented method of claim 6, wherein reading chunks from the groups of chunks that include the lost chunks comprises reading a plurality of chunks in sequence from a device within the storage array after a single seek.

8. The computer-implemented method of claim 6, further comprising overwriting redundant data within the storage array with the rebuilt chunks.

9. The computer-implemented method of claim 6, further comprising copying the rebuilt chunks to locations specified by the storage map.

10. The computer-implemented method of claim 1, further comprising rebuilding chunks lost due to failure of a plurality of devices within the storage array by:
- reading, in parallel from a plurality of devices within the storage array, chunks from groups of chunks that include the lost chunks;
- rebuilding single lost chunks from the groups of chunks that include the lost chunks by reversing parity calculations;
- rebuilding lost chunks from groups of chunks that lost a plurality of chunks by reversing parity calculations using calculated parity data for a plurality of groups of chunks;
- writing, in parallel to a plurality of devices within the storage array, the rebuilt chunks to different devices within the storage array.

11. A system for decreasing RAID rebuilding time, the system comprising:
- an identification module that identifies data for which there is a need for physical integrity and high availability;
- a segmentation module that segments the data sequentially into a plurality of groups of chunks, each group of chunks comprising redundant data sufficient to rebuild a lost chunk within the group of chunks;
- a storage module that:
  - stores the groups of chunks on a storage array according to a four-cycle-free bipartite storage map that:
    - for each group of chunks, stores each chunk on a different device set within the storage array;
    - when a chunk within a group of chunks is lost, enables all other chunks within the group to be read in parallel from different devices within the storage array;
  - prior to storing a group of chunks, verifies that the mapping of the group of chunks is four-cycle-free by calculating the eigenvalues of the adjacency matrix of the bipartite storage map;
- at least one processor configured to execute the identification module, the segmentation module, and the storing module.

12. The system of claim 11, wherein the storage module stores at least two chunks in sequence on a device within the storage array to enable the chunks to be read in sequence using a single seek.

13. The system of claim 11, wherein the redundant data comprises calculated parity data for the group of chunks.

14. The system of claim 11, wherein the plurality of groups of chunks further comprises additional redundant data sufficient to rebuild two lost chunks within the group of chunks.

15. The system of claim 14, wherein the additional redundant data comprises calculated parity data for the plurality of groups of chunks.

16. The system of claim 11, further comprising a rebuilding module that rebuilds chunks lost due to failure of a single device within the storage array by:
- reading chunks from groups of chunks that include the lost chunks in parallel from a plurality of devices within the storage array;
- rebuilding the lost chunks by reversing parity calculations;
- writing the rebuilt chunks in parallel to a plurality of devices within the storage array.

17. The system of claim 16, wherein the rebuilding module reads chunks from the groups of chunks that include the lost chunks by reading a plurality of chunks in sequence from a device within the storage array after a single seek.

18. The system of claim 16, wherein the rebuilding module overwrites redundant data within the storage array with the rebuilt chunks.

19. The system of claim 11, wherein the rebuilding module rebuilds chunks lost due to failure of a plurality of devices within the storage array by:
- reading, in parallel from a plurality of devices within the storage array, chunks from groups of chunks that include the lost chunks;
- rebuilding single lost chunks from the groups of chunks that include the lost chunks by reversing parity calculations;
- rebuilding lost chunks from groups of chunks that lost a plurality of chunks by reversing parity calculations using calculated parity data for a plurality of groups of chunks;
- writing, in parallel to a plurality of devices within the storage array, the rebuilt chunks to different devices within the storage array.

20. A non-transitory computer-readable medium comprising one or more computer-executable instructions that, when executed by at least one processor of a computing device, cause the computing device to:
- identify data for which there is a need for physical integrity and high availability;
- segment the data sequentially into a plurality of groups of chunks, each group of chunks comprising redundant data sufficient to rebuild a lost chunk within the group of chunks;
- store the groups of chunks on a storage array according to a four-cycle-free bipartite storage map that:
  - for each group of chunks, stores each chunk on a different device set within the storage array;

when a chunk within a group of chunks is lost, enables all other chunks within the group to be read in parallel from different devices within the storage array;
prior to storing a group of chunks, verifies that the mapping of the group of chunks is four-cycle-free by calculating the eigenvalues of the adjacency matrix of the bipartite storage map.

* * * * *